United States Patent Office 3,422,701
Patented Jan. 21, 1969

3,422,701
FOLDING PEDAL GEAR FOR A BICYCLE
Salomon A. Boisis, 13 Ave. de la Grande Armee,
Paris, France
Filed Nov. 18, 1966, Ser. No. 595,472
Claims priority, application France, Dec. 15, 1965,
42,385; May 18, 1966, Ser. No. 62,132
U.S. Cl. 74—594.7                                                9 Claims
Int. Cl. G05g 1/14

ABSTRACT OF THE DISCLOSURE

The invention relates to a folding pedal construction for a bicycle in which the pedal may be moved from a position of use into a storage position by first overcoming the influence of a resilient element and thus disengaging a detent member carried by the pedal.

---

The present invention relates to a folding pedal gear for bicycles.

In bicycles which are arranged to have a minimum of bulk so that they may be readily transported, it is well known to use pedals which can be folded in the general plane of the components constituting the bicycle itself.

To this end, each pedal is mounted on its pedal crank so that it can be rotated through 90° about the axis of the pedal crank thus permitting it to turn sideways and become unobtrusive.

It is an object of the invention to provide a folding pedal gear made up from components which are easy to machine, this permitting an assembly to be obtained which is of fairly low cost. It is a further object to ensure that a simple operation only is required to operate the means for concealing the pedal and which shall inhibit rusting, the said means being sealed and constantly lubricated, so that it shall be safe when the pedal is folded out into the position of use.

It is a further object to allow efficient locking of the pedal to the pedal crank by locking a sleeve with respect to the crank. This arrangement avoids the raising of the pedal by compression of a spring whose rigidity is limited by reason of the effort which it would be necessary to supply in order to compress the spring and unlock the sleeve and the pedal for its rotation.

Accordingly, the invention comprises a folding pedal gear for a bicycle, wherein the end of a crank carrying the pedal has a cylindrical part which receives a pivoting and sliding sleeve on which is fixed the axle of the pedal, said sleeve having at least one locking tooth which is engaged for the position of use of the pedal, under the action of a resilient member supported on a shoulder of the crank and on the sleeve, in at least one corresponding recess of a ring fixed to the end of the crank.

Figure 1:
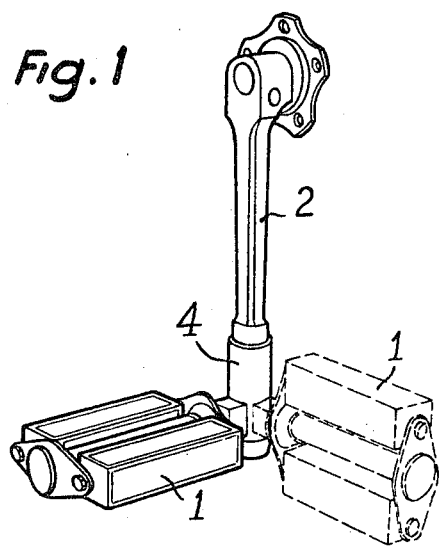
Figure 2:
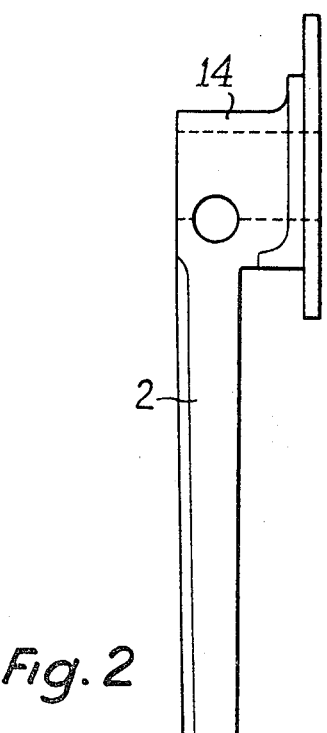
Figure 3:
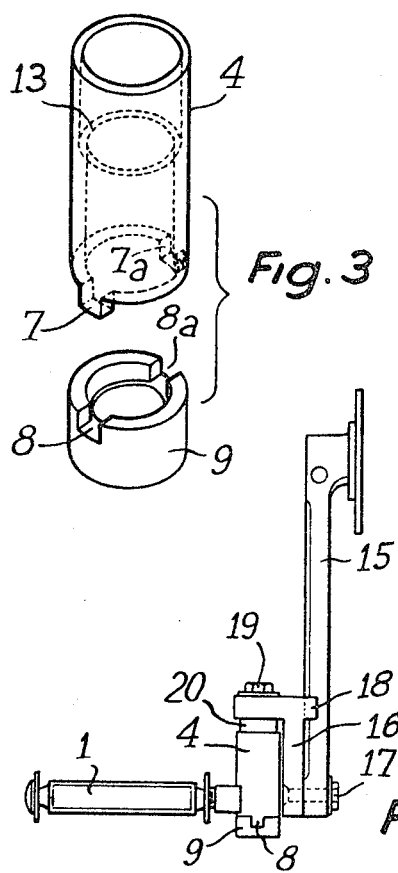
Figure 4:
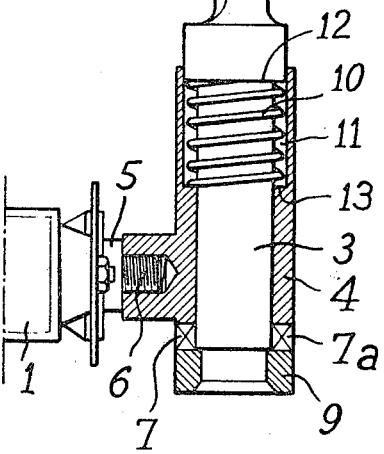
Figure 5:
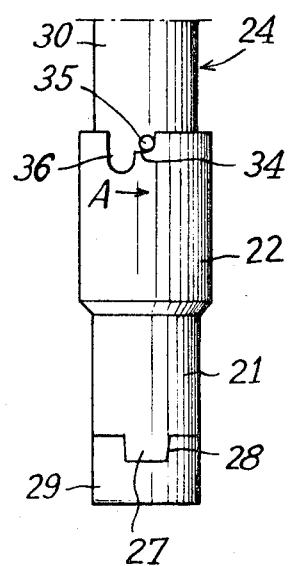
Figure 6:
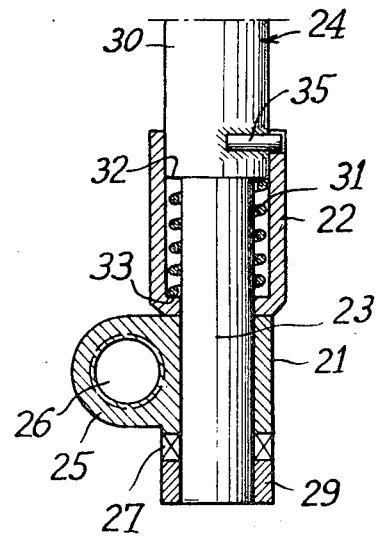
Figure 7:
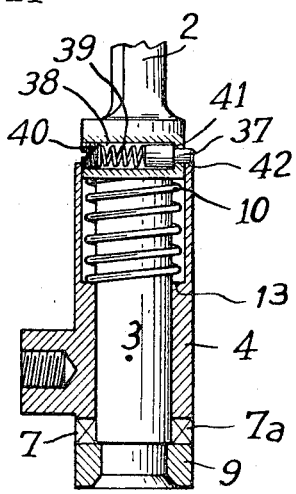

In order that the invention may be more clearly understood, reference will now be made to the accompanying drawings which show some embodiments thereof by way of example and in which:

FIGURE 1 is a perspective view of a pedal in position of use, with the folded position shown in dotted lines, FIGURE 2 is a view in longitudinal section through the device permitting the pedal to be folded, FIGURE 3 is a perspective view of the engaging members of the pedals, FIGURE 4 is a view in side elevation of another embodiment of folding pedal according to the invention, FIGURE 5 is an elevational view of the sleeve according to another embodiment, FIGURE 6 is a section through the sleeve along a perpendicular plane of FIGURE 5, and FIGURE 7 is a section through another embodiment.

Referring now to the drawings, FIGURE 1 shows a pedal 1 which is mounted to pivot about the axis of a pedal crank 2, so that it can be located in the position of use which is shown in solid lines, and in dotted lines for the folded position after the pedal 1 has been rotated through 90° about the axis of the crank 2.

The end of the crank 2 carrying the pedal 1 is constituted by a cylindrical rod or bearing 3 which receives a sleeve 4 which is mounted to slide and pivot, on which is fixed an axle 5 of the pedal, by means of a threaded spigot 6 (FIGURE 2), although other attachment means be provided, if required.

The sleeve 4 has locking teeth 7, 7a (FIGURES 2 and 3) which are engaged for the position of use of the pedal in corresponding recesses 8, 8a, in a ring 9 fixed to the end of the crank 2. The teeth 7, 7a of the sleeve are urged into the recesses 8, 8a by the action of any resilient member 10 such as a helical spring disposed in a chamber 11 of the sleeve 4 and being in abutment on the one hand against a shoulder 12 of the crank 2 and on the other hand against the base 13 of the chamber 11. The flexible member 10 could be constituted by any other type of leaf or cup spring or by a sleeve made of flexible material, in particular a rubber of the neoprene type.

When the pedal is in position of use, as shown in FIGURE 2, and the teeth 7, 7a of the sleeve are engaged in the recesses 8, 8a of the ring, under the action of the flexible member 10, it is sufficient to urge the sleeve 4 in the direction of the head of the crank 14 against the action of the spring 10 in order to release the teeth 7, 7a from their recesses 8, 8a by sliding the sleeve 4 on the cylindrical part 3 of the crank. By rotating the sleeve 4 through 90° about the cylindrical part 3 after releasing the teeth 7, 7a, the pedal 1 can be guided into the position shown in dotted lines in FIGURE 1.

FIGURE 4 shows another embodiment of the folding pedal according to the invention, which is applied to a pedal crank 15 of known type on which the folding pedal device according to the invention is attached by means of a clip 16.

In this case, the clip 16 is fixed to the crank 15 by a screw 17 or by any other fixing means which is engaged in the bore which normally receives the rod of the pedal and by a yoke 18 which clamps the crank 15. This clip 16 supports, by a screw 19, an axle 20 which is identical to the cylindrical part 3 of the above described crank 2.

According to another embodiment, the sleeve 4 is replaced (FIGURES 5 and 6) two sleeves 21 and 22 which are mounted to pivot and slide on the cylindrical end 23 of a crank 24 identical to the crank 2 of FIGURE 2. The sleeve 21 has on one of its sides an eye 25 in which is screwed, in a known manner, the axle 26 of the pedal (not shown in the drawing). This sleeve 21 has at its lower part, locking teeth 27, 27a which are identical to the teeth 7, 7a of FIGURES 2 and 3 and which are engaged for the position of use of the pedal in recesses 28 provided on a ring 29 fixed to the end of the cylindrical part 23 of the crank 24.

The sleeve 22 is guided in its lower part on the cylindrical part 23 and on its upper part on the crank 24 which has a cylindrical part 30 with a diameter larger than that of part 23.

Between the sleeve 22 and the cylindrical part 23 there is disposed a flexible member constituted by a helical spring 31 which is in abutment on the one hand against the shoulder 32 of the crank 24 and on the other hand against the base 33 of the sleeve 22. By the action of the helical spring 31, the sleeve 22 is flexibly urged against the sleeve 21 whose teeth 27 are engaged in the recesses 28 of the ring 29.

On its upper edge, the sleeve 22 comprises a groove having a locking ramp 34 which can abut against a catch 35 fixed at the crank 24, said ramp extending through an axial slot 36 which is higher than the tooth 27.

When the pedal is in the position of use, as shown in FIGURES 5 and 6, the teeth 27 are engaged in the recesses 28 under the action of the spring 33, and the catch 35 is in abutment against the locking ramp 34 so that the sleeves 21 and 22 cannot be displaced axially.

In order to fold the pedal to one side, the ring 22 is turned in the direction of the arrow A in order to guide the catch 35 into the axial slot 36 and the rings 21 and 22 are urged against the action of the spring 31 so as to release the teeth 27 from the recesses 28. By rotating the sleeve 21 about the cylindrical part 23 after releasing the teeth 27, it is thus possible to guide the pedal into a folded position located at an angle of 90° to the position of use.

FIGURE 7 shows a modification of the folding pedal as shown in FIGURE 2, provided with a means for locking the pedal in order to avoid it being raised by compression of the spring.

This locking means comprises a detent means 37 mounted to slide in a bore 38 and subjected to the action of a spring 39 in abutment on the one hand against the button 37 and on the other hand against a threaded stop means 40. The detent 37 has a shoulder 41 by means of which it abuts against a corresponding shoulder provided in the bore 38 and it projects by a certain length from the bore 38, so that under the action of the spring it is in contact with the upper edge 42 of the sleeve 4 in order to prevent said latter from sliding on the cylindrical part 3 against the action of the spring 10.

In order to raise the sleeve 4, for the purpose of releasing the teeth 7, 7a from the recesses 8, 8a, it is sufficient to urge the button 37 against the action of the spring 39 in order to conceal said latter in the bore 38 in order to ensure the passage of the sleeve 4.

I claim:

1. In a folding pedal gear for a bicycle, the combination comprising: a crank, a cylindrical part having an end means associated with said crank, first means slidably and pivotably mounted on said cylindrical part, said first means including interior and exterior surfaces, a pedal having an axle affixed to said first means, said first means also having at least one means forming a projection provided thereon, a flexible member positioned between said first means and said cylindrical part, and a second means affixed to the end of said cylindrical part, said second means having at least one recess into which said means forming the projection is forced by said flexible member in one position of said pedal.

2. In a folding pedal gear for a bicycle as claimed in claim 1, wherein said first means comprises a sleeve having a shoulder formed on the internal surface, said flexible member being interposed between said shoulder and a portion of said crank.

3. In a folding pedal gear for a bicycle as claimed in claim 1, wherein said second means is rigidly secured to said cylindrical part.

4. In a folding pedal gear for a bicycle as claimed in claim 1, wherein the means for associating said crank with said cylindrical part includes a clip means.

5. In a folding pedal gear for a bicycle as claimed in claim 1, wherein said cylindrical part is formed integrally with said crank, said first means comprising two axially disposed cylindrical sleeves adapted to surround said cylindrical part, with said pedal affixed to the first of said sleeves and the second of said sleeves being provided with the means forming the projection and arranged to support said first sleeve.

6. In a folding pedal gear for a bicycle as claimed in claim 5, wherein said crank is provided with a shoulder portion, said flexible member being interposed between said shoulder portion and said second sleeve.

7. In a folding pedal gear for a bicycle as claimed in claim 6, in which said second sleeve is provided with a groove, said groove having a locking ramp and a communicating axial slot, said crank means further including catch means, said catch means adapted to engage in the locking ramp of said groove to thereby hold said first and second sleeves in predetermined relation.

8. In a folding pedal gear for a bicycle as claimed in claim 1 further including a detent means which limits the movement of said first means on which said pedal is affixed.

9. In a folding pedal gear for a bicycle as claimed in claim 8, wherein said crank is provided with a transverse bore means, spring means contained in said bore, said detent means being mounted to slide in said bore against the action of said spring and cooperate with and retain said first means against rotary movement.

References Cited

UNITED STATES PATENTS

| | | | |
|---|---|---|---|
| 599,978 | 3/1898 | Tanner | 74—594.7 |
| 652,988 | 7/1900 | Wells | 74—594.7 |

HALL C. COE, *Primary Examiner.*